Patented Apr. 12, 1927.

1,624,055

UNITED STATES PATENT OFFICE.

JACOB LENENBERG, OF BALTIMORE, MARYLAND.

DIRT AND GREASE CLEANING COMPOSITION.

No Drawing.  Application filed February 20, 1926. Serial No. 89,779.

The object of my invention is the production of a heavy oil or butter like substance to be used in the cleaning of clothes, silks, rugs and other materials, taking out all grease and dirt, without affecting or injuring the material and without changing or affecting the dye or color of the material.

My composition consists of a mixture of a vegetable oil, such as castor oil, a non-ponderous, white earthy powder, such as magnesia, aqueous ammonia specific gravity .88, a weak acid, such as redistilled oleic acid, and acetone.

In preparing this composition, I prefer to use the ingredients in about the following proportions, viz: 25 gallons of castor oil, 25 pounds of powdered magnesia, 1 gallon of redistilled oleic acid, 1 gallon of acetone and 2 gallons of aqueous ammonia.

These ingredients are put into a mixing or washing machine, or may be mixed by hand, until the mixture takes on a heavy oillike form and a yellow color. Proportionately a quart of this mixture to 50 gallons of gasoline, will produce the results specified when used on the material to be cleaned.

My composition is light in weight, will not leave any stains, is impervious to water, easy to handle, easy to apply, and can be applied to any material, and, as a whole, possesses in a high degree all the desired properties for cleaning and removing all grease and dirt from silks, clothing and other materials.

I claim:

A composition to be used in conjunction with gasoline to form a cleaning solution, consisting of the reaction products of 25 gallons of castor oil, 25 pounds of powdered magnesia, 1 gallon of redistilled oleic acid, 1 gallon of acetone and 2 gallons of aqueous ammonia.

JACOB LENENBERG.